United States Patent
Baublys et al.

[11] 3,889,545
[45] June 17, 1975

[54] TRANSMISSION BELT

[76] Inventors: Mikas Baublys; Eugen Siegloch, both of Freiligrathstr. 23 7000-50, Stuttgart, Germany

[22] Filed: Jan. 17, 1973

[21] Appl. No.: 324,086

[30] Foreign Application Priority Data
Jan. 17, 1972 Germany.............................. 2202041

[52] U.S. Cl............................................... 74/231 M
[51] Int. Cl............................................. F16g 1/20
[58] Field of Search............ 74/231, 231 M, 231 C; 161/221, 222; 156/137–143

[56] References Cited
FOREIGN PATENTS OR APPLICATIONS
5,354    1893   United Kingdom.............. 74/231 M
803,711  2/1951 Germany............................ 161/221

Primary Examiner—Samuel Scott
Assistant Examiner—Frank H. McKenzie, Jr.
Attorney, Agent, or Firm—Eugene M. Eckelman

[57] ABSTRACT

A transmission belt is composed of a continuous length of steel band which is helically wound into superimposed layers having an elastic connection which may consist of a material possessing a shearing elasticity, a rubber or an elastic plastics material interposed between the layers, or resilient members which extend through slots formed in the belt.

7 Claims, 7 Drawing Figures 3,889,545

TRANSMISSION BELT

BACKGROUND OF THE INVENTION

1. Field of the Invention

This invention relates to a transmission belt and in particular to a transmission belt comprising a plurality of metal layers.

2. Description of the Prior Art

Belts of the above mentioned kind which are produced from a non-endless steel band by soldering or welding are already known. Belt thicknesses of about 0.6 to 1.1 mm have been obtained in this way for use with minimum belt pulley diameters of about 500 to 1000 mm. The space required is therefore extremely great and the distance between the axes of the pulleys amounts to 7 to 100 metres. This is due to the fact that the diameter of the pulley must be about 1000 times the thickness of the belt because of the permissible alternating bending stressing of the steel band. In addition, the soldered or welded joints are found to be disadvantageous, so that only limited stressing of the belt is permissible and its life is limited by the soldered or welded joints. The transmission power, which for a given speed of rotation is approximately proportional within certain limits to the thickness of the belt, its width, and the diameter of the pulley, is consequently low.

This means, quite generally speaking, that the space required for belt drives in relation to other types of drive is very great. On the other hand, the transmission power for a given construction space is comparatively low.

It has also been proposed to produce belts comprising a plurality of metal layers by forming a plurality of endless thin metal bands which have accurate diameters differing very slightly from one another and which must fit loosely in one another, while not however being joined together. Metal belts of this kind have not been successful in practice because difficulties occurring in practical manufacture are too great. Because of the unavoidable manufacturing tolerances it is in fact not possible to ensure that all the metal bands will take the load simultaneously and to equal extents.

Belt drives known at the present time for transmitting power and converting rotational speed or torque, namely, flat belts, such as leather belts, textile belts, composite plastics belts, toothed belts, rubber or V-belts, despite numerous advantages, also have an important disadvantage, namely, the fact that the transmissible power, which for a given speed of rotation is within certain limits approximately proportional to the thickness and width of the belt and the diameter of the pulley, is low, which means that the space required for these belt drives is very great in comparison with other kinds of drive, for example gear and worm drives.

SUMMARY OF THE INVENTION

The problem underlying the invention consists in improving belts of the kind first mentioned above in such a manner that for given dimensions it is possible to transmit higher power without the life of the belt being reduced. At the same time the invention should enable the high tractive force of the metal band to be utilized and nevertheless make it possible to achieve great flexibility, so that high powers can be transmitted even when using small belt pulleys.

According to the invention a belt comprises a thin endless metal band helically wound to form a plurality of superimposed layers (1 – 4) and having an elastic connection.

A very thin metal band, for example with a thickness of about 0.1 mm or less, preferably 0.06 mm, preferably a band of spring steel, is preferably used for this purpose. Nevertheless, tractive power can be then increased to a multiple by increasing the thickness of the belt in the manner described below, so that there is practically a free choice of thickness. Calculations and experiments have shown that the transmissible power of a belt according to the invention can be increased by a multiple. The life of the belt is not thereby reduced in comparison with that of known belts, but is considerably lengthened. The invention therefore makes it possible for new fields of application to be found for belt drives and to use the latter where only a very restricted constructional space is available and special requirements are imposed in respect of the life of the belt.

In one embodiment of the invention provision is made for layers of material possessing a shearing elasticity to be disposed between the individual metal layers. This material is preferably rubber bonded by vulcanization, but an elastic plastics material may also be used.

It is also possible for the elastic connection between the layers to be formed by resilient metal members. These resilient members may extend through slots in the belt so that the necessary movability of the individual metal layers in relation to one another is possible. These resilient members thus merely ensure that the layers are loosely held together.

Finally, the invention also provides a method of producing a belt comprising the steps of helically winding a thin metal band around a winding mandrel and interposing between the superimposed layers of the band a material possessing rubber-like elasticity. After the winding operation the material can be hardened by heating. The method is relatively simple and makes it possible for the most diverse lengths of belt to be obtained at low cost, since to produce different lengths of belt it is simply necessary to use a different winding mandrel.

Moreover, the outstanding advantage is gained that the cross-section can, at low cost, be produced from any number of layers of metal band. At the same time flexibility is also great because the metal bands can be extremely thin, and this means that the flexibility of the individual layer and consequently of the entire belt is relatively very great, so that a belt of this kind can run on a pulley having a diameter less than 100 mm for the purpose of transmitting high power. The intermediate layers of rubber or the like are also preferably kept thin. The belt according to the invention may be used as a flat belt, or a V-belt, and for exact speed transmission also in the form of toothed belts, since it is possible for teeth to be fitted by vulcanization. It is also possible to coat the running side of the belt with an elastic coating of a material possessing great adhesive friction when used as a flat belt.

DESCRIPTION OF THE PREFERRED EMBODIMENTS

Figure 1:
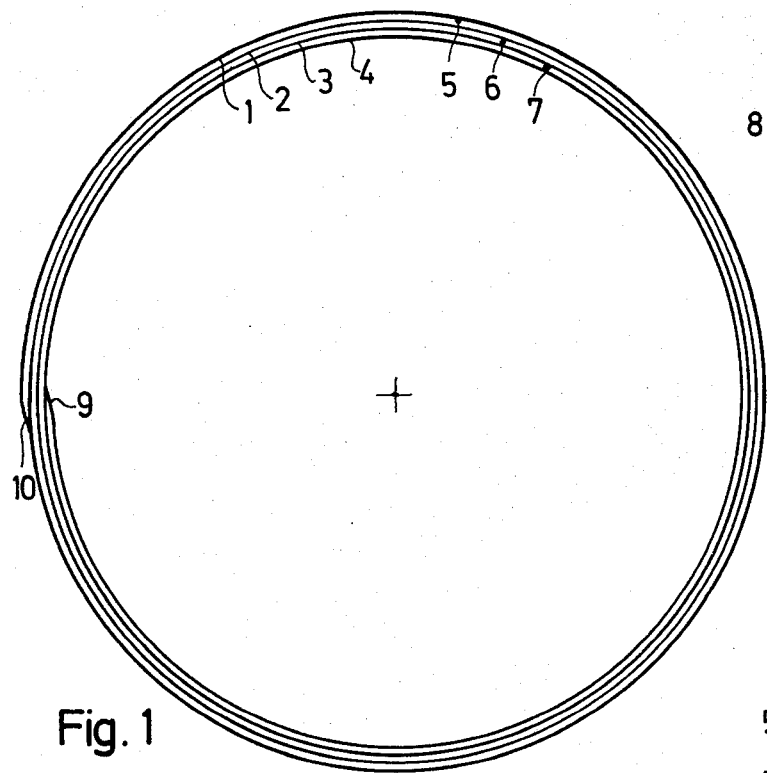
FIG. 1 is a side view of a belt according to the invention.

Referring to the drawings, FIG. 1 shows a belt according to the invention, which comprises a plurality of layers 1, 2, 3, and 4 of a very thin continuous metal band, between which are disposed thin elastic layers 5, 6, 7 of a material possessing rubber-like elasticity. As can be seen, the continuous band is helically wound to form the layers 1 to 4, so that by using a longer or shorter band it is possible to form more or fewer layers. The beginning of the wound band is designated 9 and its end 10. Since the metal band is extremely thin, it may have a wall thickness of under 0.1 mm, no difficulties occur at the point 9. It is, however, possible to grind or otherwise machine the end 9 if a slightly greater band thickness is selected.

Figure 2:
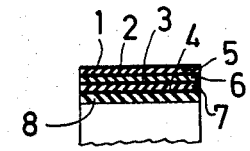
FIG. 2 is a section through another embodiment.

According to FIG. 2, the belt includes an additional running layer 8 of a material capable of increasing friction. In this case the previously mentioned machining of the end 9 as illustrated in FIG. 1 is not necessary. The running layer, for example, may be secured in place by vulcanization. It may, however, also be applied in other ways, for example by adhesive bonding. This measure is particularly preferred, because metal usually has only a low coefficient of friction, for example in relation to metal, when the running surface of a pulley for the belt is of metal.

Figure 3:
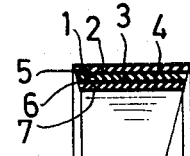
FIG. 3 is a section through a third embodiment.

FIG. 3 shows a V-belt the edges of which are formed at an angle which can, for example, be produced by grinding and can then be used as an adjustable drive.

Figure 4:
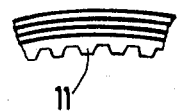
FIG. 4 is a side view of a portion of a belt according to a fourth embodiment.

FIG. 4 shows a toothed drive belt with the toothed layer 11 on the running surface, the toothed layer preferably being of an elastic material.

Figure 5:
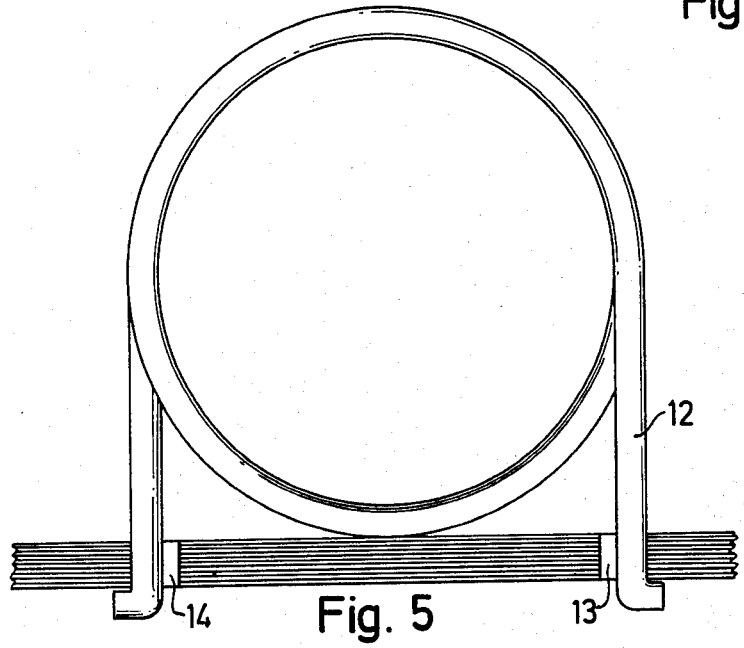
FIG. 5 is a section through a further embodiment.
Figure 6:
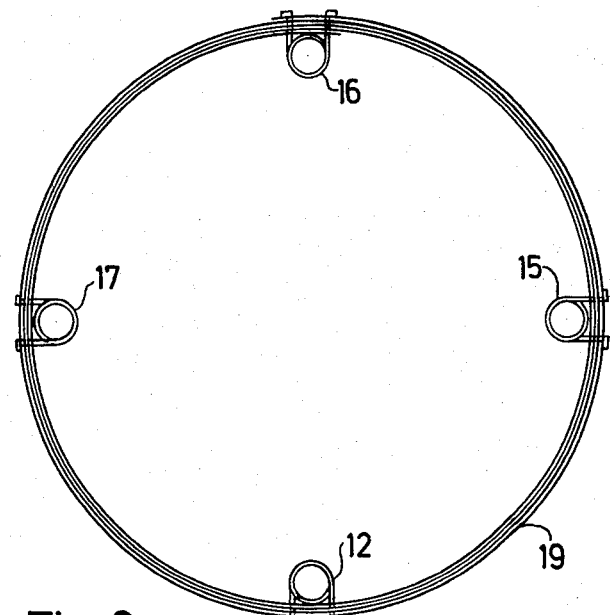
FIG. 6 is a side view of the belt of FIG. 5.

According to FIGS. 5 and 6, spring members 12, 15, 16, 17 may form resilient connections between the individual layers of the belt 19, in the manner illustrated, the ends of the spring members engaging in slots 13 and 14 in the belt. The complete belt is illustrated in FIG. 6 with the springs 12, 15, 16 and 17.

Figure 7:
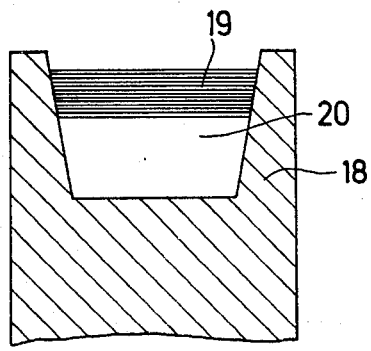
FIG. 7 is a section through a pulley and belt substantially in accordance with the embodiment illustrated in FIG. 3.

In this case a pulley 18, as illustrated in FIG. 7 is provided with recesses 20 through which the spring members can run. In known V-belt drives provision is in any case made for the torque to be transmitted on the belt edges in accordance with the angle of the edges, as illustrated in FIG. 3, so that the free space 20 is left.

The illustrations in FIG. 5 to FIG. 7 are to be regarded as merely diagrammatic, and entirely different spring connections are possible for movably holding together the individual metal layers of the belt according to the invention.

For the production of the belt according to the invention a special method is provided, namely the thin metal band is wound onto a winding mandrel (not shown). It will however, be understood that the surface shown in FIG. 1 inside the belt forms the cross-section of a winding mandrel on which the band is wound with the layers 1 to 4. The intermediate layers 5 to 7 are applied thinly to the band either before or during the winding; the intermediate layers may be of rubber or plastics material. For the curing of the intermediate layers the belt can then be placed in an oven for a predetermined time.

The running layer 8 or teeth 11 can be applied by vulcanization either subsequently or more or less simultaneously.

In addition, it is possible for the individual layers to be adhesively bonded to one another, in which case curing in an oven can generally be dispensed with.

The belt according to the invention is exceptionally elastic and makes it possible to transmit powers amounting to a multiple of the power of known belts, without modifying dimensions. In addition, it is possible to use substantially smaller pulleys for transmitting a determined power, and, as calculations and experiments have shown, the life of the belt is substantially lengthened.

The principle of the invention nevertheless consists of a structure wherein the individual layers are permitted to move over very short paths in relation to one another.

I claim:

1. A transmission belt comprising an endless band arranged for driving engagement over a pair of pulleys, said band consisting of a single length of a thin flexible metal strip disposed in a helically wound structure formed of a plurality of superimposed layers, and elastic connection means intermediate said layers elastically connecting said layers together for integrated assembly but allowing a desired longitudinally movability therebetween to provide for the necessary bending stresses as the belt moves around a pulley.

2. A belt according to claim 1, wherein the elastic connection means comprises material having a rubber-like elasticity.

3. A belt according to claim 1, wherein the surface thereof that is adaptable for engagement with the pulleys is covered with a material having a high coefficient of friction in relation to that of the pulley.

4. A belt according to claim 1, wherein the side edges thereof are angled inwardly in the form of a V-belt and arranged for engagement with a V-belt pulley.

5. A belt according to claim 1, wherein the surface thereof that is adaptable for engagement with the pulleys has teeth arranged for engagement with toothed pulleys.

6. A belt according to claim 1, wherein the elastic connection between the layers is formed by resilient metal members.

7. A belt according to claim 6, wherein the belt is provided with slots through which the resilient members extend with a clearance.

* * * * *